(12) United States Patent
Nassor

(10) Patent No.: US 6,687,800 B1
(45) Date of Patent: Feb. 3, 2004

(54) CHIP CARD COMPRISING MEANS AND METHOD FOR MANAGING A VIRTUAL MEMORY AND ASSOCIATED COMMUNICATION METHOD

(75) Inventor: Azad Nassor, Villepreux (FR)

(73) Assignee: Bull CP8, Louveciennes (FR)

( * ) Notice: Subject to any disclaimer, the term of this patent is extended or adjusted under 35 U.S.C. 154(b) by 0 days.

(21) Appl. No.: 09/446,003

(22) PCT Filed: Apr. 14, 1999

(86) PCT No.: PCT/FR99/00877

§ 371 (c)(1),
(2), (4) Date: Dec. 15, 1999

(87) PCT Pub. No.: WO99/53401

PCT Pub. Date: Oct. 21, 1999

(30) Foreign Application Priority Data

Apr. 15, 1998 (FR) ............................................. 98 04693

(51) Int. Cl.[7] ........................... G06F 12/00; G06F 12/12
(52) U.S. Cl. ......................... 711/159; 711/115; 711/165
(58) Field of Search ................................. 711/159, 160, 711/165, 101, 133, 134, 135, 136, 115; 707/206

(56) References Cited

U.S. PATENT DOCUMENTS 5,408,633 A * 4/1995 Katsumura et al. ........ 381/68.4
5,634,058 A   5/1997 Allen et al.
5,737,585 A   4/1998 Kaneshima

FOREIGN PATENT DOCUMENTS

| EP | 0 282 992 A | 9/1988 |
| EP | 0 626 664 A | 11/1994 |
| EP | 0 811 911 A | 12/1997 |
| FR | 2736735 A   | 1/1997 |

* cited by examiner

*Primary Examiner*—Matthew Kim
*Assistant Examiner*—Matthew D. Anderson
(74) *Attorney, Agent, or Firm*—Edward J. Kondracki; Miles & Stockbridge P.C.

(57) ABSTRACT

The invention relates to a chip card (21) including an information processing means and main information storage means, which operates to load and unload a programmable memory as a function of the need for the program run by the card and for applicative data. The processing means comprises a means for detecting, during the operation of the chip card, that the main storage means contain a quantity of information such that the execution of an operation is not possible. The chip card also includes a means for selecting, in the main storage means, a set of information (K) to be unloaded. The unloading of the set of information (K) releases enough space in the main storage means to allow the execution of the operation. Also included is a means for unloading the set of information (K) to be unloaded into secondary storage means (23 through 25), in the event that the secondary storage means does not contain the set of information to be unloaded.

18 Claims, 2 Drawing Sheets

CHIP CARD COMPRISING MEANS AND METHOD FOR MANAGING A VIRTUAL MEMORY AND ASSOCIATED COMMUNICATION METHOD

BACKGROUND OF THE INVENTION

1. Field of the Invention

The present invention relates to a chip card comprising means for managing a virtual memory.

2. Description of Related Art

For about twenty years, the chip card has played a vital role in everyday life. The banking field is primarily interested in microcircuit cards; their main advantage is to reduce fraud. Pay TV and radiotelephone companies use them as means for generating keys that are used to encipher and decipher encrypted transmissions. To guarantee security, it was necessary to create a new integrated circuit architecture. Cards of the electronic purse type contain a sum of electronic money; other, so-called frequent-customer cards, offer their holders financial rewards.

Nowadays, devices related to microcircuit cards, and more particularly microprocessor cards, are usable in an increasingly large number of applications. At first, the operating system of the cards, i.e., the program located in ROM, could only handle one application. The operating system is written during the production of the microcircuit. By increasing the size of the program memory (ROM) and of the nonvolatile programmable memory (EPROM and EEPROM, and today FeRAM), the operating system can execute more functions. But the number of these functions is still limited by the size of the ROM. Moreover, the addition of another function into the ROM involves producing a new mask; this production is very expensive and is really only profitable when a large quantity of cards is involved.

One way to increase the number of these functions without touching the ROM memory consists of writing the executable program, and the data that allows it to run, into the programmable memory. It is thus possible to add additional functions to an operating system that initially has only a set number of functions. The patent application FR-A-2.748.134 describes a means for loading the program into the programmable memory. But the programmable memory is of limited size; once it is filled with a program, it is not possible to add functions. Moreover, the storage of this program takes away from the memory space intended for data in the programmable memory. The preceding method is used to correct certain defects in the program located in ROM or to add some other functions. If a card must run a program of very large size, the method described in this document can prove to be inadequate.

SUMMARY OF THE INVENTION

The object of the present invention is to solve this problem by proposing a method for loading and unloading the programmable memory as a function of the need for the programs and/or the applicative data, for an information processing device constituted by a card. Thus, it becomes possible for the latter to run very diverse applications, such as: electronic purse, banking application, GSM telephony or the health care application currently being tested in France. With the aid of the present invention, the applications just listed are virtually inside the card. The owner of the card has loaded them in advance; thus, the card is configured according to his specific needs.

The present invention also makes it possible to solve another problem. A user may need to simultaneously open the same application twice. The running of this application in an information processing device such as a card lasts a certain amount of time. To speed up the process, it is advantageous to be able to start a second running of the application before the end of the first. Thus, the same program is running twice, at the same time.

This object is achieved by the fact that the card is equipped with an operating system comprising at least three functions:

Loading of applicative information.
Unloadingof applicative information.
Execution of applicative information.

To acquire a new application, the card receives applicative information in its programmable memory and checks this data.

When a command for running an application is received by a reader cooperating with the card, the operating system of the card analyzes the contents of its memory and determines whether it is necessary to use the network to unload part of its memory, and/or reload-previously unloaded applicative information.

During the reloading of applicative information, the operating system of the card verifies that the information loaded has been validated by it in the past. This information is then processed.

The network may be considered to be an extension of the programmable memory of the card; the latter sends it what it cannot keep in its own memory. It verifies, during the reloading, that the information received from the network is in fact that which it had sent previously. The ROM of the card must have a mechanism for managing the programmable memory that allows it to load and run an unlimited number of applications. From then on, the sizes of the ROMs and programmable memories of the card are no longer a limitation on the number of executable applications, and there is no need to produce a new mask when applications are added.

In summary, the invention relates to a chip card comprising information processing means and main information storage means, characterized in that the processing means comprise:

means for detecting, during the operation of the card, that the main storage means contain a quantity of information such that the execution of an operation is not possible;

means for selecting, in the main storage means, a set of information to be unloaded, the unloading of which can release enough space in the main storage means to allow the execution of said operation;

means for unloading the set of information to be unloaded into secondary storage means, in the event that said secondary storage means do not contain this set of information to be unloaded.

The invention also relates to the associated method. Lastly, it relates to a protocol for communication between a chip card and a chip card reader, the card comprising information processing means and main information storage means, characterized in that it comprises the steps consisting in that:

the reader transmits to the card an order to execute an operation;

the card searches to see if it has enough space in the main storage means to execute this operation;

if so, the card executes this operation, then transmits an execution report to the reader;

if not, the card selects in the main storage means a set of information to be unloaded, the unloading of which can release enough space in the main storage means to allow the execution of this operation, then the card unloads the set of information to be unloaded into secondary storage means by transmitting an unloading order to the reader, in the event that these secondary storage means do not contain this set of information to be unloaded, then it executes said operation, then finally, transmits an execution report to the reader.

BRIEF DESCRIPTION OF THE DRAWINGS

Other details and advantages of the present invention will appear in the following description of several preferred but non-limiting embodiments, in reference to the appended drawings, in which.

DESCRIPTIONS OF THE PREFERRED EMBODIMENT(S)

Figure 1:
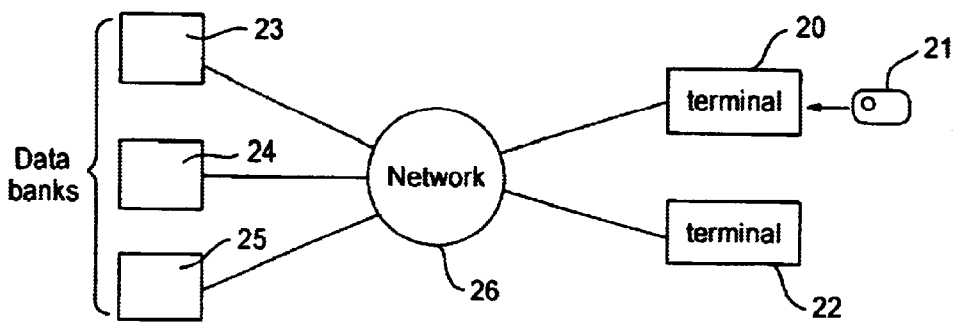
FIG. 1 represents an information processing network used by the invention.

In FIG. 1, a terminal 20 capable of reading a chip card, or a terminal 22 integrating chip card functionalities, cooperates with remote data banks 23 through 25 and is linked to them through a data communication network 26. The data communication network 26 can be a telephone network, the Internet network, or any other data communication network. Each data bank comprises a central data processing unit that manages a memory. According to the invention, and as indicated above, the card 21 or the terminal 22 can, when they detect that the loading of a new application into the latter is not possible because of a lack of memory space, decide to unload another application into one of the data banks 23 through 25. This unloading releases enough memory space to receive the new application. If the card 21 or the terminal 22 subsequently needs the unloaded application, it can send the corresponding data bank a command to reload the application after having, if necessary, released the memory space again by unloading an application.

Figure 2:
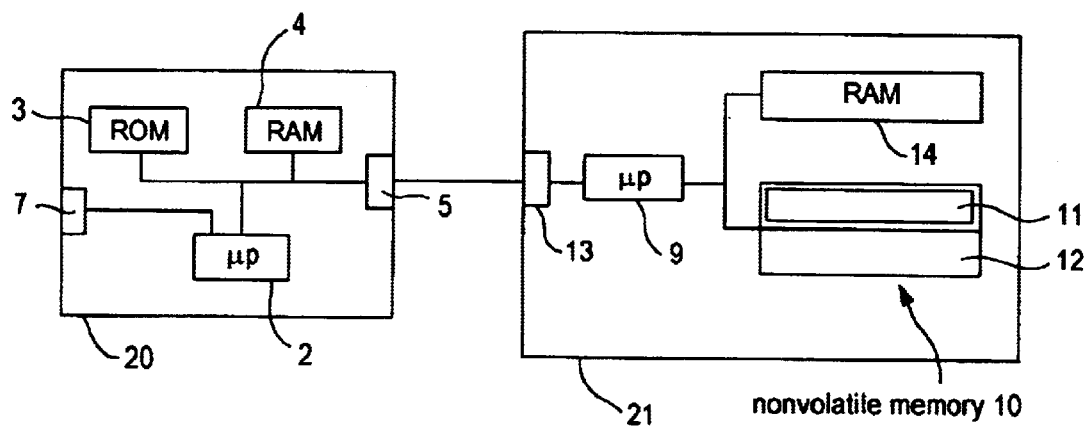
FIG. 2 represents an information processing device, used in FIG. 1 and cooperating with a chip card.

The configuration of the terminal 20 and the card 21 is indicated in FIG. 2. The terminal comprises, in an intrinsically known way, a microprocessor 2, to which are connected a ROM 3 and a RAM 4, means 5 for cooperating, with or without physical contact, with the chip card 21, and a transmission interface 7 that allows the terminal to communicate with the data communication network 26 of FIG. 1. The terminal 20 can also be equipped with storage means such as diskettes or disks that may or may not be removable, entry means (such as a keyboard and/or a pointing device of the mouse type) and display means, these various means not being represented in FIG. 2.

The terminal can be constituted by any data processing device installed in a private or public site and capable of providing means for managing information or delivering various goods or services, this device being permanently installed or portable. It can also be a dedicated telecommunications device.

In addition, the card 21 carries a chip that includes information processing means 9, a nonvolatile memory 10, a volatile working memory RAM 14, and means 13 for cooperating with the terminal 20. This chip is designed to define, in the memory 10, a secret area 11 in which information, once recorded, is inaccessible from outside the chip and is accessible only to the processing means 9, and an accessible area 12 that is made accessible from outside the chip by the microprocessor 9 for reading and/or writing information. Each area of the nonvolatile memory 10 can comprise a non-modifiable ROM part and a modifiable part that is an EPROM, EEPROM or is constituted by a RAM of the "flash" type or FRAM (the latter being a ferromagnetic RAM), i.e., having the characteristics of an EEPROM with access times identical to those of a conventional RAM.

For the chip, it is possible to use a self-programmable microprocessor with a nonvolatile memory, as described in U.S. Pat. No. 4,382,279 in the name of the Applicant. As indicated in column 1, lines 13–25 of this patent, the self-programmable feature of the chip corresponds to the possibility for a program fi located in a ROM to change another program fj located in a programmable memory into a program gj. In a variant, the microprocessor of the chip is replaced—or at least supplemented—by logic circuits installed in a semiconductor chip. In effect, such circuits are capable of performing calculations, including authentication and signature calculations, because of the hardwired, rather than microprogrammed, logic. They can be of the ASIC type (for "Application Specific Integrated Circuit".) As an example of an ASIC, it is possible to cite the SIEMENS component marketed under the reference number SLE 4436 and the SGS-THOMSON component marketed under the reference number ST 1335. Advantageously, the chip will be designed in monolithic form.

Figure 3:
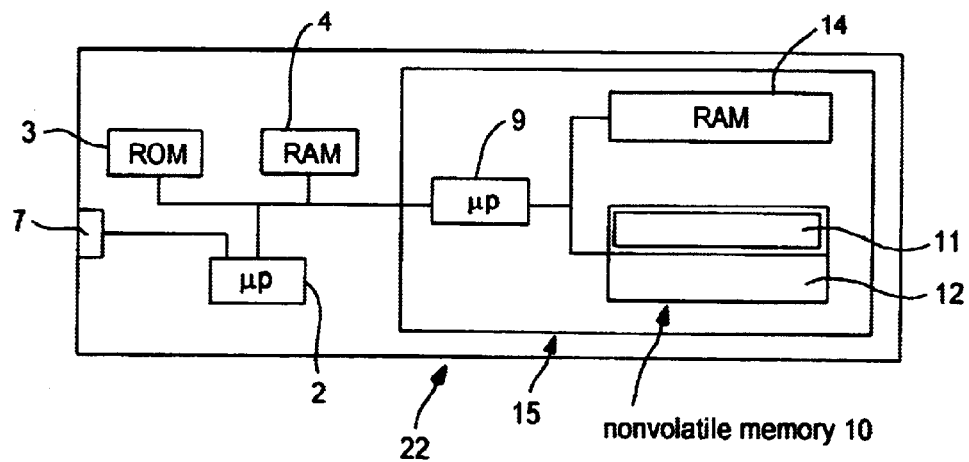
FIG. 3 represents a variant of FIG. 2, wherein the information processing device integrates the functionalities of the chip card.

A variant of FIG. 2 is illustrated in FIG. 3, wherein the terminal 22 of FIG. 1 comprises, in addition to the elements of the terminal 20, those of the card 21 disposed in a module 15, the elements common to both FIGS. 2 and 3 having the same references. However, the cooperating means 5, 13 of FIG. 2 are replaced by a permanent link between the microprocessor 2 and the microprocessor 9.

Figure 5:
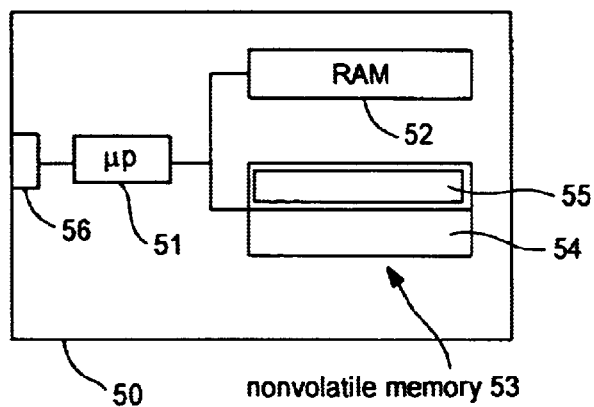
FIG. 5 represents a variant of FIG. 3.

A variant of FIG. 3 is represented in FIG. 5. In this case, the terminal 50 comprises only one microprocessor 51 or the equivalent, connected to a RAM 52 and to a nonvolatile memory 53. The nonvolatile memory 53 comprises an area 54 made accessible from outside the terminal by the microprocessor 51, and a secret area 55 accessible only to the microprocessor 51. The microprocessor 51 has the self-programmable characteristic of the microprocessor 9 described in connection with FIG. 2. Finally, the terminal 50 has a transmission interface 56 that allows it to communicate with the data communication network 26 of FIG. 1.

The following description refers, in a non-limiting way, to the embodiment of FIG. 2, and the terminal 20 is called a "reader" because of its function of reading the card 21.

The memories of the card are organized in the following way: a memory of the ROM type, a working memory of the RAM type, and a programmable nonvolatile memory of the EEPROM or FLASH type. As represented in Table 1, the ROM contains a basic operating system area comprising a minimum of sub-programs or routines such as the input/output and memory read/write routines and an area for the operating system of a virtual memory, this virtual memory being constituted by the memory of the data banks 23 through 25. The basic operating system and the operating system of the virtual memory together form what will hereinafter be called the "operating system of the card."

The operating system of the virtual memory is preferably capable of handling at least nine commands. At least four commands are sent by the reader to the card:

Loading of applications into the card.

Running of the previously loaded applications in the card.

Erasure of applications in card.

Checking for presence of applications in card.

Five other commands are sent by the card to the reader:

Unloading of applications to the network.

Reloading of applications from the network.

Suspension of the loading process.

Resumption of the loading process.

Erasure of applications in the network.

In one particular embodiment, the operating system of the virtual it memory filters and transmits to the program of the application loaded in programmable memory all the orders received from outside that must be processed by this program.

In the present text, the term "information" generally designates any executable program or non-executable data. The term "application" designates a particular program for implementing an application of a provider of services or products, and associated application data.

Again according to table 1, the programmable memory comprises at least three areas:

a first, so-called "system data" area containing a code "C" identifying the card;

a second, so-called "managementsdata" area containing management data of the applications, i.e., a signature key called "SWAP," specific to each card, one or more encryption keys linked as necessary to application providers or to particular applications, and a table called "TAB-APPLI", and a third, so-called "loading" area used to receive the information of applications, i.e., of the executable program, and/or the data necessary to the running of this program.

Initially, the card can be given to its holder with a loading area and a table TAB__APPLI that are empty. At least the key SWAP is located in the secret area 11 of the nonvolatile memory 10 of the card.

TABLE 1

Application information loading area
Management data area (SWAP, TAB__APPLI, etc.)
System data area (code C, etc.)
Area for the operating system of the virtual memory (ROM)
Basic operating system area (ROM)

The table TAB-APPLI contains the information corresponding to the applications available in the card, whether these applications are physically contained in the card, or whether they are contained in the card virtually, having been unloaded into the network. It has the following structure:

TABLE 2

TAB__APPLI

| Code of the application | Storage address | Number of bytes | Signature of the information | Load/Unload |
|---|---|---|---|---|
| I | ADR-I | l | SGN-I | Loaded |
| J | ADR-J | m | SGN-J | Unloaded |
| K | ADR-K | n | SGN-K | Loaded |

The table TAB__APPLI comprises as many rows as there are applications made available by the card, and for each row, five columns. A first column defines an identification code I, J, K of the application. A second column divines a storage address ADR-I, ADR-J, ADR-K starting at which the application is stored in the card. A third column defines a number of bytes representing the quantity of information of the application. A fourth column defines a signature that applies to the all of the bytes of the application, calculated using an algorithm and the key SWAP of the card as a secret key. The algorithm used can be a symmetrical. algorithm such as D.E.S. (Data Encryption Standard), or an asymmetrical algorithm such as R.S.A. (for the authors Rivest, Shamir and Adelman); advantageously, however, it suffices to use a simpler function, such as a hash function like MD5 or SHA, or a function such as the "exiclusive OR" since, within the framework JZF of the invention, the signature does not leave the card and is therefore protected. Finally, a fifth column defines whether the state of the application in question is "loaded" into the card or "unloaded" into a data bank.

First, a card holder or an application provider wants to load into the card a first application having an identification code "K." The execution of a load command can be conditioned by a successful authentication of the cardholder or application provider. The authentication mechanism, which itself is well known, consists, for the holder or application provider, of supplying the card with information that allows it to ensure that it is dialoging with an authorized interlocutor.

The load command contains a loading order, the code C of the card, the code K of the application and the number of bytes n of, information corresponding to this application, which results in the following command format:

| Loading Order | Card C | Appli K | number n |
|---|---|---|---|

Once the command has been received by the card, the operating system of the card verifies whether the code C sent is actually the same as that recorded in the system data area. If not, the card returns an error message to the network. If so, the information of the application is in fact intended for this card; the operating system of the card then reads the table TAB__APPLI in the management data area to determine whether or not this is an initial load. Initially, TAB__APPLI does not contain information on the application K; if that is not the case, the card responds to the reader with the message "application already loaded"; if it is the case, this is an initial load. The operating system of the card determines whether the n bytes can be accommodated in its memory; if so, it calculates the start address "ADR-K" of a first block of n bytes available in the loading area. If not, it returns the message "insufficient memory". Finally, the card indicates to the reader that it can send the n bytes of the application, using the response "OK__Load". The reader then sends the n bytes of the application.

Once the information of the application has been stored in programmable memory, the operating system of the card calculates the signature "SGN-K" of this information. It then re-enters into the table TAB_APPLI the application code K, the storage address ADR-K, the number of bytes n, and the signature SGN-K. Once this operation has been performed, the "Load/Unload" indicator is set to "Loaded." The updating of the table TAB_APPLI being finished, the operating system of the card can then send a report, through the reader, to the card holder or the application provider, indicating that the loading of the application has been performed correctly. The table TAB_APPLI then has the following structure

TABLE 3

TAB_APPLI

| Code of the application | Storage address | Number of bytes | Signature of the information | Load/Unload |
|---|---|---|---|---|
| K | ADR-K | n | SGN-K | Loaded |

According to a first variant, just after the loading, the operating system of the card can start the executable program contained in the applicative information, i.e., in the information of the application. This makes it possible to initialize the applicative information. For example, in the case of an electronic purse application, the first execution of the program makes it possible to set the balance of the purse written into the memory at 0 francs. According to a second variant, the executable program is started when a first command is sent by the reader to the card, calling the application in question. Simply put, the execution start address of the application is "ADR-K", but it is possible to use an indirect addressing; the designated address is then, in a way that is known in the microprocessor field, the content of the memory marked [ADR-K] that contains the execution address.

The reader sends the card commands, specifying the type of application; for example, this type can be coded into the first of the five bytes of a command, in accordance with the ISO 7816-3 standard; in this standard, this byte is called "CLA." The operating system of the virtual memory of the card checks the commands that the reader sends it and determines the code of the application corresponding to the command. Then, it reads in the table TAB_APPLI whether the code has been written; if that is the case, the card can run the application K. If it is not the case, the card cannot run the application K; it responds by sending an error message. If the code K is written into TAB_APPLI, the value of the "Load/Unload" indicator is then tested. If it is set on "Loaded," the applicative information is in fact present in the programmable memory of the card. In that case, the operating system of the card passes control to a program of the application located at the address ADR-K or [ADR-K]. We will see below what happens when the programmable memory of the card does not contain the applicative information, because it has already been unloaded.

Let us now assume that the card holder or application provider wants his card to contain the information of a second application, for example marked "J". This is possible by loading the applicative information "J" into the programmable memory of the card. Just as before, the card holder or application provider is authenticated by presenting a secret followed by the following command for loading applicative information:

| Loading order | Card C | Appli J | number m |
|---|---|---|---|

It is similar to the preceding command related to the loading of the application K; in this case, the number of bytes of the application is m.

The operating system of the card verifies the code C and searches for the first block of m bytes available in the programmable memory. Let us assume that the programmable memory cannot physically contain the two blocks of applicative information constituted by the application K and the application J simultaneously, but that itxcan contain the application J if it unloads all or part of the application K. The card informs the reader that it is suspending tlheprocess for loading the application J by means of a specific command sent to the reader, and then decides to unload the application K into a data bank, which will be considered as the virtual memory of the card. This unloading will release the memory space for loading the application J.

The unloading then consists of transferring into one of the data banks 23 through 25 of the network, intended specifically for the current card, the applicative information specific to this card. Because of the signature calculation performed during the loading, the card is assured of being able to control the integrity and the authenticity of its own information during a subsequent reloading. Moreover, the fact that the signature calculation has already been performed during the initial load optimizes the run time of the load command. The card sends the card reader the following command:

| Order to unload to the network | Card C | Appli K | number n | n bytes of information |
|---|---|---|---|---|

This command comprises, as the loading command, the code C of the card, the code K of the application to be unloaded, and the number of bytes n of information of the application; it also comprises the contents of these same n bytes of information, transmitted to the reader at the same time as the unloading order. In the event that the unloading of the application occurs when part of it has already been executed, context information, which makes it possible to subsequently resume the running of the application at the point where it was interrupted, is either stored in the programmable memory of the card, or added to the n bytes of information of the application and unloaded into the network at the same time as the latter.

It is possible to indicate a destination identifier in the form of a network address. Advantageously, the network has a mapping table that associates each card with the address of the data bank that is specifically intended for it. This makes it possible to prevent the card from having to store this address or this identifier, and to gather in the same data bank all the information unloaded from the same card.

The reader receives the command, but recognizes that it is intended for the network: it then sends it to the data bank to which it is addressed. If the network has several data banks, the choice can be made as a function of the code C of the card. The data bank receives the n bytes of applicative information and returns to the card, via the reader, an acknowledgement of successful reception indicating that the storage has actually taken place. The card then modifies the table TAB_APPLI by setting the Load/Unload indicator to "Unloaded." The memory space occupied up to that time by the applicative information of the application K becomes available. The operation for loading the application J can then resume and the card sends the reader a command to resume the loading process; the loading operation takes place in a way that is identical to that of K. The operating system of the card determines the storage address ADR-J of the m bytes of the applicationsJ and indicates to the reader through a message "OK_Load" that it can send the m bytes of applicative information.

The reader sends the m bytes of applicative information that are written starting at the address "ADR-J." Once the information of the application J is stored in programmable memory, the operating system of the card calculates a signature for it by performing a cryptographic calculation using the key SWAP. Finally, the operating system updates the table TAB_APPLI by writing the code J the values ADR-J, m and.SGN-J, and updates the "Load/Unload" indicator, setting it to "Loaded." The operating system can then send the reader a report indicating that the loading has been correctly performed.

The table TAB_APPLI then has the following values:

TABLE 4

TAB_APPLI

| Code of the application | Storage address | Number of bytes | Signature of the data | Load/Unload |
|---|---|---|---|---|
| K | ADR-K | n | SGN-K | Unloaded |
| J | ADR-J | m | SGN-J | Loaded |

Once the updating of the table TAB_APPLI is finished, the operating system of the card than then start the application J in the same way that it started the application K and the card executes the run command sent to it by the reader.

If the card holder or application provider connects his card to a reader and wants to run the application K again, the operating system of the card analyzes the contents of the table TAB_APPLI to determine whether this application is accessible with this card. In the present case, the application K is recorded in TAB_APPLI, but it has been unloaded into the network. Another application is in memory, i.e., J, and it occupies m bytes. The operating system then tests to see whether the application K, which occupies n bytes in memory can be loaded into the remaining available memory. As assumed above, the response to this test is negative. The operating system then decides to unload the current application J in order to be able to reload the application K.

The command, sent by the card, for unloading J into the network is:

| Order to unload into the network | Card C | Appli J | number m | m bytes of information |
|---|---|---|---|---|

Once the operation has been performed, the indicator of the loading of the application J into TAB_APPLI is set to the "Unloaded" position. The memory space now being available, the operating system sends the reader a command to reload the application K from the network. This command has the following format:

| Order to reload from the network | Card C | Appli K | number n |
|---|---|---|---|

The reader receives the command and sends it to the data bank associated with the card C. The data bank that has the information of the card C receives the command and searches in the file of this card for the n bytes of applicative information relative to the application K. The data bank generates the following message, which is the response to the card's last command. This response is transmitted to the card via the reader:

| Card C | Appli K | number n | n bytes of data |
|---|---|---|---|

The operating system of the card can verify whether the codes C, K and the value n received are in fact identical to those of the unloading command sent previously. If they match, the command continues with the reception of the n bytes of data, which are written starting at the address ADR-K into the loading area, this address being read for this purpose by the operating system in the table TAB_APPLI or retrieved from reloaded context information. At the same time, the operating system calculates the signature of the n bytes written through a cryptographic calculation using the value of the key SWAP. The recalculated signature is then compared to the value written into the table TAB_APPLI. If the data received from the network is not identical to that previously unloaded, the two signature values will not be equal. There is therefore a doubt as to the authenticity or integrity of the information received. The loaded information cannot be processed. The card sends the reader an error message indicating an erroneous reception of information during the last loading operation, and the impossibility of running the application K; the operating system does not set the load indicator to the "loaded" position; if necessary, it may erase the contents of the application K.

If, on the other hand, the two signature values are equal, the information received does correspond to that of the application K previously loaded into the card. Once these checks are done, the operating system of the card updates the table TAB_APPLI by setting the loading indicator of the application K to the "Loaded" position.

The table TAB_APPLI then has the following values:

TABLE 5

TAB_APPLI

| Code of the application | Storage address | number of bytes | Signature of the data | Load/Unload |
|---|---|---|---|---|
| K | ADR_K | n | SGN-K | Loaded |
| J | ADR_J | m | SGN-K | Unloaded |

Once the update of the table TAB_APPLI is finished, the operating system starts the application K as before, and the card can execute the last applicative type command sent by the reader.

As described above, when the card receives a command to load an application not currently stored, the operating system of the card tests the available space in memory. If there is enough space, the loading can be done without unloading the application currently in memory. There are then two applications in the card. The table TAB_APPLI therefore has the following configuration:

TABLE 6

TAB_APPLI

| Code of the application | Storage address | number of bytes | Signature of the data | Load/Unload |
|---|---|---|---|---|
| K | ADR-K | n | SGN-K | Loaded |
| I | ADR-I | l | SGN-I | Loaded |
| J | ADR-J | m | SGN-J | Unloaded |

In this example, two applications I and K coexist in the card; they are directly executable. A third application J is accessible by means of this card, but it must be reloaded from the network. The nonvolatile memories of the card contain the following information:

TABLE 7

| ADR-K | ADR-I | Available |
|---|---|---|
| Program of the application K | Program of the application I | |
| Data of the application K | Data of the application I | |
| | Management data (key SWAP, TAB_APPLI, etc.) | |
| | System data (code C, etc.) | |
| | Operating system of the virtual memory (ROM) | |
| | Basic operating system (ROM) | |

This table corresponds to the above-mentioned Table 1, in which the loading area breaks down as follows: it is clear that the area for loading the applicative information comprises three sub-areas: an area receiving the information of the application K, an area receiving the information of the application I, and a residual available area whose size is less than m.

In light of this example, the characteristics of the invention can be better understood. The card is equipped with a minimum operating system that makes it possible to manage the memory space, to load or unload applications, to sign the applicative information to be unloaded into the network, to verify the applicative information unloaded into and received from the network by comparing the signatures, and to start applications loaded into the memory. The signature makes it possible to verify that the applicative information stored in the data bank has been previously loaded into this card. The reader is equipped with a program that recognizes the commands for unloading and reloading the card and means for transmitting these commands to the network. Finally, the network is equipped with data banks, the memory of which banks can be considered to be an extension of the programmable memory of the card.

As seen in the preamble, the writing of routines into the programmable memory in order to modify the running of the program in ROM can only be done by persons who know this program. The jumps to these routines and their returns into the program in ROM require precise knowledge of the addresses, the input and output parameters of these routines, the utilization ratio of the working memory, etc. The present invention solves this problem by avoiding using these routines, and consequently revealing the specifications of these routines while allowing the running of numerous applications. The applicative programs are executed using the program in ROM as little as possible. The designer of this program can indicate the entry points to certain so-called elementary routines: receiving bytes, sending bytes, writing n bytes into programmable memory, cryptographic calculation, etc.

A first improvement of the invention consists of encrypting the applicative information in order to protect it during its various transfers between the information processing device intended to receive applications (such as the card 21 or the terminal 22 of FIG. 1) and the network, and during their storage outside the card 21 or the terminal 22.

A first application encryption relates to the initial load of the application by an application provider and uses a basic secret key held by the information processing device and the application provider located in the network; in the event that the information processing device is a card, its reader does not know the basic key. Advantageously, each application is encrypted with a specific diversified key obtained from the basic key and from a diversifier constituted by a specific parameter of the application, for example its code K or its storage address ADR-K in the programmable memory. This diversifier can be stored in the table TAB_APPLI so that the operating system can easily retrieve it during load/unload commands.

During the initial load of the application by the application provider into the information processing device 21 or 22, this provider calculates the diversified key associated with this application and encrypts the application using the latter before sending it into the network; upon reception, the information processing device calculates the diversified key associated with this application and decrypts it with this key before storing it in the loading area of the: programmable memory.

A second encryption of the application relates to the loads and unloads performed by the informationr processing device 21, 22. During an unloading of the application by the information processing device 21, 22 to a data bank, the application is again encrypted by this device. The encryption key used should not be shared by the information processing device with any interlocutor other than the application provider, no matter which key generated by the information processing device is suitable, since it is this device, and this device alone, that will perform the subsequent decryption.

Advantageously, the card can use the method described by the document U.S. Pat. No. 4,907,270, the object of which is to provide a process for ensuring the authenticity and integrity of an encrypted message.

The encryption described above makes it possible to prevent applicative information from being discovered by a hacker, and prevents the fraudulent copying of the applicative programs.

In addition to the commands described above, it is possible to provide two additional commands: a command for erasing applications and a command for checking for the presence of applications on the card.

The command for erasing applications consists, for the card holder or the application provider, of sending the card a command intended to delete the applications that are no longer used; its format is the following:

| Application erasure order | Card C | Appli K | number n |
|---|---|---|---|

It comprises an application erasure order, the code C of the card in question, the code K of the application, and possibly the number n of bytes of information of the application. If the application in question is loaded into the card, the operating system of the card frees up the memory space reserved up to now for the application K. If, on the other hand, the application K has been unloaded into a data bank, the card sends the latter an erasure order that has the same format as the one above. Finally, once the erasure order has been carried out, the operating system erases the row of the table TAB_APPLI related to this application.

The command for checking for the presence of applications on the card can take two different forms. The first form of the command allows the card holder or application provider to ask the card if it has a particular application; its format is the following:

| Order to check for the presence of applications | Card C | Appli K | number n |
|---|---|---|---|

It comprises an order to check for the presence of applications, the code C of the card in question, the code K of the application, and possibly the number n of bytes of information of the application.

The second form of the command allows the card holder or application provider to ask the card for all of the rows of its table TAB_APPLI, except of course for the signatures and possibly the number n of bytes and the load indicator. The format of the command is the following:

| Order to check for the presence of applications | Card C |
|---|---|

A second improvement of the invention consists of not starting the unloading of an application to the network until it is necessary. If, at the moment the memory must be released, the loaded application has not been modified and the network already has the same applicative information of this application, it is not necessary to unload this information. The object of the second improvement is to avoid storing the same applicative information values several times in the network.

To implement this improvement, it is necessary to modify the table TAB_APPLI; here is the new structure:

TABLE 8

| TAB_APPLI | | | | | |
|---|---|---|---|---|---|
| Code of the application | Storage address | number of bytes | Signature of the information | Load/ Unload | Modification |
| K | ADR-K | n | SGN-K | Loaded/ Unloaded | YES/NO |

A sixth column has been added to the table, which contains an indicator named "Modification" that can have two values: Yes or No. During the initial load of an application, the indicator is set to "Yes"; this value indicates that it is necessary to unload the applicative information to the network in order to release the corresponding memory space. On the other hand, after a command to reload from the network, the indicator is set to "No"; this value indicates that the applicative information. stored in programmable memory of the information processing. device (card 21 or terminal 22 of FIG. 1) are identical to those stored in the data-bank of the network. As long as the indicator remains at "No," the operating system of the information processing device does not execute a command for unloading the application; it simply sets the loading indicator to the "Unloaded" position so that another application can take its place in memory. The indicator is set to "Yes" when the applicative information is modified; consequently, the signature value is no longer exact; it must be recalculated during the unloading.

This modification can occur in at least two cases. The first case is an update of the applicative program, either in order to add to its performance by adding supplementary functions or to correct a problem. The second case occurs frequently when, in the programmable memory of the information processing device 21 or 22, data are mixed with the application program. For example, an electronic purse application simultaneously contains both the software for managing debits and credits and data such as the balance. With each utilization, this value generally changes, and therefore the indicator "Modification" is nearly always in the "Yes" position.

The latter example leads to a third improvement of the present invention. It is clear that in the applicative information, the executable program and the applicative data values capable of evolving often exist simultaneously. The means described in the third improvement described below actually make it possible to separate the two types of information. The information processing device then chooses to unload to the network only the information it has actually modified.

In order to achieve this third improvement, it is necessary to improve the organization of the nonvolatile memories, which can be diagrammed in the following way:

TABLE 9

| Program of the application (programmable memory) Data of the application | Changing data, sequence 1 | Changing data, sequence 2 |
|---|---|---|
| Management data (key SWAP, TAB_APPLI, etc.) in programmable memory System type data in programmable memory (code C, etc.) Operating system of the virtual memory (ROM) Basic operating system (ROM) | | |

Table 9 differs from Table 1 above by the structure of its loading area of the programmable memory, which appears as follows:

a block related to the application as such and comprising two sub-blocks of information:
  a block related to the executable program of the application, marked "program of the application";
  a block related to the changing (non-executable) data of the application, marked "data of the application";
a certain number of changing (non-executable) data blocks. corresponding to particular executions of the executable program; these executions will hereinafter be called "sequences." By definition, the data of a sequence is temporary, i.e., it is used only during this sequence, and not during previous or subsequent sequences. This is what distinguishes them from the above-mentioned "data of the application," which are used during all the sequences. In Table 9, two data blocks of sequences are represented, called "changing data, sequence 1" and "changing data, sequence 2." The role of these different blocks of information will be explained in the example below.

In order to achieve this third improvement, the table TAB_APPLI is modified; it has the following structure:

TABLE 10

TAB_APPLI

| Application code/ Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| P/1 | ADR-Cod-P | p-cod | SGN-cod-P | Loaded | ADR-Dat-P/1 | p-dat | SGN-dat-P/1 | Loaded |
| P/2 | ADR-Cod-P | p-cod | SGN-cod-P | Loaded | ADR-Dat-P/2 | p-dat | SGN-dat-P/2 | Loaded |
| J/1 | ADR-Cod-J | j-cod | SGN-cod-J | Loaded | ADR-Dat-J/1 | j-dat | SGN-dat-J/1 | Loaded |
| J/2 | ADR-Cod-J | j-cod | SGN-cod-J | Loaded | ADR-Dat-J/2 | j-dat | SGN-dat-J/2 | Unloaded |

Compared to the above-mentioned table TAB_APPLI 2, this table has the following differences. The first column specifies, in addition to the application code, the number "i" of the sequence in question. The information is processed in two groups: those related to the executable program and the data of the application, and those related to the changing data of the sequences. For each group of information, there are the following four columns of the table TAB_APPLI 2: storage address, number of bytes, signature, load indicator. Each row of the table corresponds to a data sequence P/1 or P/2, both related to an application P, or a sequence J/1 or J/2, both related to another application J. In different cells of the table, the code of the application is mentioned in order to indicate that the value in question is related to a given application, for example:

ADR-Cod-P: storage address related to the application P
j-cod: number of bytes related to the application J.
Furthermore, the symbol "Cod" indicates that the value in question is related to information of the "application" type (program or data of the first group), while "Dat" indicates that the value in question is related to information of the "sequence" type (data of the second group); for example:
SGN-cod-P: signature of information (program or data) related to the application P SGN-dat-J/2: signature of data related to sequence No. 2 of the application J.

An example will better describe the problem posed and the way to solve it using the present invention.

The information processing device (card 21 in this case) has just received an initial load command for the application P: a payment application of the electronic purse type. The applicative information stored in programmable memory is the executable program and the data related to the application; there is not yet any changing data corresponding to a sequence. This information comprises n-Cod bytes stored starting at an address ADR-Cod-P. The load indicator is set to "Loaded." In addition to the information related to the executable program and to the data of the application, the information transmitted during the command contains a number of bytes of changing data "p-dat" related to a sequence i. The table TAB_APPLI therefore has the following values:

TABLE 11

TAB_APPLI

| Application code Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| P/1 | ADR-Cod-P | p-cod | SGN-cod-P | Loaded | 0 | p-dat | 0 | 0 |

The transactions are validated by an electronic circuit called a security module. This module can be located either in the card reading terminal 20 of FIG. 1 or, if maximum security is desired, in an approved banking center, which can be located very far from the terminal 20. A transaction of the electronic purse type takes place in several stages that require communications between the card, the terminal and the security module. The purchase can be made at a store equipped with a terminal with a module, but it can also be made at the home of the card holder, whose terminal is not equipped with a module.

The card is used to make a purchase by means of a transaction initialization order. The operating system of the card recognizes an order of the, applicative type; it then queries its table TAB__APPLI. The query of the table tells it that the application corresponding to the order is in fact loaded and that no sequence has been allocated. The operating system then initializes a sequence by assignin git a number, "1" for example. It allocates this sequence a memory space of "n-dat" bytes, starting at the address ADR-Dat-P/1. The load indicator corresponding to this sequence is set to "Loaded." The table TAB__APPLI then has the following values:

The purchase of a first product is in progress; the card sends the reader 20 a message in order to obtain a validation of the transaction from a payment center accessible through the network. This communication can last for some time. In fact, the communications can be disturbed and the data sent can take a long time to be analyzed by the approved banking center. This causes an increase in the global duration of the transaction. During this time, the user decides to make a second purchase. The present invention makes it possible to avoid waiting for the end of the first transaction before beginning the second one.

To make this second purchase, the card is used a second time by a new transaction initialization order. Just as before, the operating system of the card verifies that the executable program of the electronic purse application is loaded into programmable memory. This verification is done by query-

TABLE 12

TAB__APPLI

| Application code Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| P/1 | ADR-Cod-P | n-cod | SGN-cod-P | Loaded | ADR-Dat-P/1 | n-dat | 0 | Loaded |

Next, the operating system of the card starts the applicative program by executing a jump to the address ADR-Cod-P; it specifies the address ADR-Dat-P/1 of the temporary data to be used, which allows the application to know the place where the data of the sequence is stored. This data includes, among other things, the amount of the transaction, the object of the transaction, the selling institution and the date of the transaction. On the other hand, data such as the balance of the electronic purse is not temporary sequence data, since its lifetime exceeds that of a sequence; being of the applicative type, this data is stored with the program of the application.

ing its table TAB__APPLI; the operating system thereby recognizes the presence of the program and of a sequence (1) that is in progress. For this reason, it assigns this second execution a new sequence number (2) and initializes the table TAB__APPLI by adding a new row to it. Then, it verifies whether there is enough space to allocate n-dat bytes in the programmable memory for the information of the non-executable data type. If there is enough space, a new address ADR-Dat-P/2 is determined and the second transaction can be started. The table TAB-APPLI has the following values.

TABLE 13

TAB__APPLI

| Application code/ Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| P/1 | ADR-Cod-P | n-cod | SGN-cod-P | Loaded | ADR-Dat-P-1 | n-dat | 0 | Loaded |
| P/2 | ADR-Cod-P | n-cod | SGN-cod-P | Loaded | ADR-Dat-P/2 | n-dat | 0 | Loaded |

The two transactions will then be performed in parallel in the card, without using the network. The reader must indicate, in the applicative commands sent to the card, the transactions to which they refer.

If there is not enough space, the operating system of the card decides to unload only the changing data corresponding to the first transaction (sequence number 1). It then calculates the signature of this data of the first sequence "SGN-dat-P/1," and writes it into the table TAB_APPLI. The new non-executable data can thus be in the same place as the unloaded data, i.e., at an address common to both sequences and marked ADR-Dat-P. Next, the card sends the reader the following command:

| Order to unload Card C to the network | Appli P - Data - sequence number 1 | number n__dat | "n__dat" bytes of data |
|---|---|---|---|

This command has a structure identical to the one mentioned above, with the following difference: the third cell contains a parameter specifying not only the code P of the application, but also the fact that the data is of the sequence type (through the term "Data"), and the number 1 of the sequence in question.

As a result of this command, the table TAB_APPLI has the following values:

As a result of this operation, the second transaction having the sequence number 2 can continue. This new transaction also requires a validation from the payment center; a request is therefore sent to the security module. Let us assume that at this moment the card receives a validation message for the first transaction. The operating system of the card recognizes, by means of the sequence number, that this message relates to a transaction other than the current one and, by reading the table TAB_APPLI, it recognizes the first transaction. In order to process it, it must then load the non-executable data of the first transaction.

Given that there is not enough memory space for both blocks of data, the operating system of the card must therefore unload the data of the second transaction. It therefore calculates the signature of this data "SGN-dat-P/2," and writes it into the table TAB_APPLI. Then, the card sends the reader the following command:

| Order to unload card C to the network | appli P - data - sequence number 2 | number n__dat | "n__dat" bytes of data |
|---|---|---|---|

TABLE 14

TAB_APPLI

| Application code/ Sequence number | Information related to the executable program and to the data of the application ||||| Information related to the changing data of the sequences marked "i" |||||
|---|---|---|---|---|---|---|---|---|---|
| | storage address | number of bytes | signature | Loaded / Unloaded | Storage address | number of bytes | signature | Loaded / Unloaded |
| P/1 | ADR-Cod-P | n-cod | SGN-cod-P | Loaded | ADR-Dat-P | n-dat | SGN-dat-P1 | Unloaded |
| P/2 | ADR-Cod-p | n-cod | SGN-cod-P | Loaded | ADR-Dat-P | n-dat | 0 | Loaded |

The table TAB_APPLI then has the following values:

TABLE 15

TAB_APPLI

| Application code/ Sequence number | Information related to the executable program and to the data of the application ||||| Information related to the changing data of the sequences marked "i" |||||
|---|---|---|---|---|---|---|---|---|---|
| | storage address | number of bytes | signature | Loaded / Unloaded | Storage address | number of bytes | signature | Loaded / Unloaded |
| P/1 | ADR-Cod-P | n-cod | SGN-cod-P | Loaded | ADR-Dat-P | n-dat | SGN-dat-P1 | Unloaded |
| P/2 | ADR-Cod-P | n-cod | SGN-cod-P | Loaded | ADR-Dat-P | n-dat | SGN-dat-P/2 | Unloaded |

The operating system of the card then sends the reader the following command:

| Command to reload from the network | Card C | Appli P - Data - sequence number 1 | number n-dat |
|---|---|---|---|

This command differs from the reload command already written in that the third cell contains aparameter specifying not only the code P of the application, but also the fact that the data is of the sequence type (through the term "Data"), and the number 1 of the sequence in question.

The reader receives the command and sends it the data bank specifically assigned to the card C. The data bank searches in the file of this card for the n-dat bytes of non-executable data related to the application P, sequence number 1. The data bank generates the following message, which is the response to the card's last command; this response is transmitted to the card via the reader:

| Card C | Appli P - Data - sequence number 1 | n-dat | n-dat bytes of data |
|---|---|---|---|

This command differs from the response to a reload command already written in that the second cell contains a parameter specifying not only the code P of the application, but also the fact that the data is of the sequence type (through the term "Data"), and the number 1 of the sequ ence in question.

The operating system of the card can perform a preliminary operation in which it verifies whether the codes C, P, the sequence number and the value n-dat received are in fact identical to those of the command sent previously. If they match, the n-dat bytes received are stored starting at the address ADR-dat-P read in the table TAB_APPLI. Once the last byte has been written, the operating system recalculates the signature of the data by means of a cryptographic calculation using the value of the key SWAP. The recalculated signature is then compared to the value "SGN-dat-P/1" written in the table TAB_APPLI. If the two signature values are not equal, the data received from the network is considered not to be identical to that unloaded previously. There is therefore a doubt as to the authenticity or integrity of the data received. The card returns to the reader an error message indicating the reception of erroneous data during the last load operation, and the impossibility of continuing the transaction.

If the two values are equal, the data received are considered to be identical to those previously unloaded by the card: the first transaction can therefore continue. The operating system of the card then updates the table TAB_APPLI by setting the indicator for the data of the application P/1 to "Loaded."

TABLE 16

TAB_APPLI

| | Information related to the executable program and to the data of the application | | | | Information related to the changing data of the sequences marked "i" | | | |
|---|---|---|---|---|---|---|---|---|
| Application code/ Sequence number | storage address | number of bytes | signature | Loaded / Unloaded | Storage address | number of bytes | signature | Loaded / Unloaded |
| P/1 | ADR-Cod-P | n-cod | SGN-cod-P | Loaded | ADR-Dat-P | n-dat | SGN-dat-P1 | Loaded |
| P/2 | ADR-Cod-P | n-cod | SGN-cod-P | Loaded | ADR-Dat-P | n-dat | SGN-dat-P/2 | Unloaded |

The updating of the table TAB_APPLI being finished, the operating system starts the application P, which will continue the first transaction.

The first transaction being finished, the execution of the program of the application ends with a return to the operating system that manages the virtual memory. The operating system recognizes the end of the sequence "1" and decides to release the memory space corresponding to the data of this sequence. To do this, it erases the information "storage address", "signature" and the load/unload indicator by setting them to the value zero.

The table TAB_APPLI then has the following values:

TABLE 17

TAB_APPLI

| Applica-tioncode/ Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| P/1 | ADR-Cod-P | n-cod | SGN-cod-P | Loaded | 0 | n-dat | 0 | 0 |
| P/2 | ADR-Cod-P | n-cod | SGN-cod-P | Loaded | ADR-Dat-P | n-dat | SGN-dat-P/2 | Unloaded |

When the card receives the validation of the second transaction, the operating system of the card recognizes, by means of the sequence number, that the message relates to another transaction that is not loaded. The first transaction being finished, the corresponding non-executable data are no longer useful. There is no therefore no need to unload them. It suffices to load the non-executable data corresponding to the second transaction. The operating system sends the reader the following command:

| Command to reload from the network | Card C | Appli P - Data - sequence number 2 | number n-dat |
|---|---|---|---|

Just as for the loading of the sequence 1, the reader receives the command and sends it to the data bank. The data bank searches in the file of this card for the n-dat bytes of non-executable data related to the application P, sequence number 2. The data bank generates the following message, which is transmitted to the card via the reader:

| Card C | Appli P - Data - sequence number 2 | number n-dat | n-dat bytes of data |
|---|---|---|---|

The operating system of the card can perform a preliminary operation in which it verifies the codes C, P, the sequence number, and the value n-dat received. If the verification is positive, the bytes are written. Then, the operating system calculates and verifies the signature of the data. If the two values are equal, the data received are considered to be identical to those previously unloaded by the card; the second transaction can therefore continue. The operating system updates the table TAB_APPLI by setting the load indicator of the application P/2 to "Loaded."

TABLE 18

TAB_APPLI

| Applica-tioncode/ Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| P/1 | ADR-Cod-P | n-cod | SGN-cod-P | Loaded | 0 | n-dat | 0 | 0 |
| P/2 | ADR-Cod-P | n-cod | SGN-cod-P | Loaded | ADR-Dat-P | n-dat | SGN-dat-P/2 | Loaded |

The updating of the table TAB_APPLI being finished, the operating system starts the application P, which will continue the second transaction.

The second transaction being finished, the program of the application ends with a return instruction to the operating system managing the virtual memory. The operating system deduces from this that the sequence "2" is finished; the memory space can then be released. To do this, the locations in the table TAB_APPLI of: "storage address", "signature" and the load/unload indicator are set to zero. The table takes on the following values:

TABLE 19

TAB_APPLI

| Applicationcode/ Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| P/1 | ADR-Cod-P | n-cod | SGN-cod-P | Loaded | 0 | n-dat | 0 | 0 |
| P/2 | ADR-Cod-P | n-cod | SGN-cod-P | Loaded | 0 | n-dat | 0 | 0 |

At this stage, the operating system of the card can completely erase one row of the table TAB_APPLI. The management of the rows of the table TAB_APPLI therefore takes place dynamically as a function of need.

Another, static method for managing the table is to decide once and for all the maximum number of executable sequences for an application; let "" be this number. "s" is then transmitted during the initial load command for the application; the operating system reserves in the table TAB_APPLI the space corresponding to these "s" sequences. Let s have, for example, the value 2.

The command for loading the application K has the following values:

| Loading Order | Card C | Appli K | n-cod | number n n-dat | s=2 |
|---|---|---|---|---|---|

This command differs from the one described previously in that it includes a fifth cell defining the value of the parameters. It will be noted that in this case the command specifies the number n-cod of bytes related to the application and sent by the cozmnand, and the number n-dat of bytes related to each future sequence and reserved for this use. In a variant, the number n-dat of bytes mmay not be transmitted at this stage, but provided to the operating system of the card later by the application that is loaded into the card.

As a result of this command, the operating system updates the table TAB_APPLI with the following values:

TABLE 20

TAB_APPLI

| Applicationcode/ Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| K/1 | ADR-Cod-K | n-cod | SGN-cod-K | Loaded | 0 | n-dat | 0 | 0 |
| K/2 | ADR-Cod-K | n-cod | SGN-cod-K | Loaded | 0 | n-dat | 0 | 0 |

The application K can now be run: two sequences are possible.

The card can virtually contain several complete applications, each equipped with several sequences. For example, here is one particular configuration of the table TAB_APPLI:

TABLE 21

TAB_APPLI

| Application code/ Sequence number | Information related to the executable program and to the data of the application | | | | Information related to the changing data of the sequences marked "i" | | | |
|---|---|---|---|---|---|---|---|---|
| | storage address | number of bytes | signature | Loaded / Unloaded | Storage address | number of bytes | signature | Loaded / Unloaded |
| K/1 | ADR-Cod-K | k-cod | SGN-cod-K | Unloaded | 0 | k-dat | 0 | 0 |
| K/2 | ADR-Cod-K | k-cod | SGN-cod-K | Unloaded | ADR-Dat-K/2 | k-dat | SGN-dat-K/2 | Unloaded |
| K/1 | ADR-Cod-K | k-cod | SGN-cod-K | Unloaded | ADR-Dat-K/3 | k/dat | SGN-dat-K/3 | Loaded |
| J/1 | ADR-Cod-J | j-cod | SGN-cod-J | Loaded | ADR-Dat-J/1 | j-dat | SGN-dat-J/1 | Loaded |
| J/2 | ADR-Cod-J | j-cod | SGN-cod-J | Loaded | ADR-Dat-J/2 | j-dat | SGN-dat-J/2 | Unloaded |

Corresponding to this example, the card virtually has two applications marked K and J. The executable program of the application K is not in the loading area; three sequences of this application, marked 1, 2 and 3, can be executed at the same time. The first sequence is finished, the other two are currently being executed. The sequence 2 is unloaded; it will therefore be necessary to reload it in order to finish it. Also, to finish the sequences 2 and 3, it will be necessary to reload the executable program and the data of the application K.

The executable program of the application J is in the loading area; this application can simultaneously execute two sequences, marked 1 and 2, which are currently being executed. The sequence 2 is unloaded; it will be necessary to reload it in order to finish it.

This example illustrated the need to properly manage the available memory space. The loading area should be occupied as much as possible, thus avoiding the Unload and Reload commands as much as possible.

Quite clearly, the improvement that consists of encrypting the data, in addition to signing them, when unloading, and of decrypting them when loading/reloading, can be applied to this third improvement.

An improvement of the procedure for initially loading an application into a card consists of entering into the card a signature of the applicative information calculated from a key of the application provider. This signature makes it possible to ensure the integrity of the applicative information and to authenticate the source of this applicative data.

The initial load according to the improvement consists of presenting the card to the application provider. It is recommended that this operation be done on the application provider's premises. The application provider enters into the card his provider key, the signature of the applicative information, and the application code, K for example. The card holder executes a request to initially load the application K. This request, which has been described above, can be made at his home. A method for performing the initial load of an application in a protected way is described in the document FR-A-2.748.134.

According to a variant of embodiment of the invention, the applications stored in a card are not unloaded into a remote data bank through a network; it is the reader 20 of FIG. 2 that receives and stores these applications; it therefore has for this purpose a nonvolatile programmable memory in which the applications are stored. The load and unload commands are unchanged. This variant is advantageous when the card is always inserted into the same reader, for example a reader located at the card holder's home.

Figure 4:
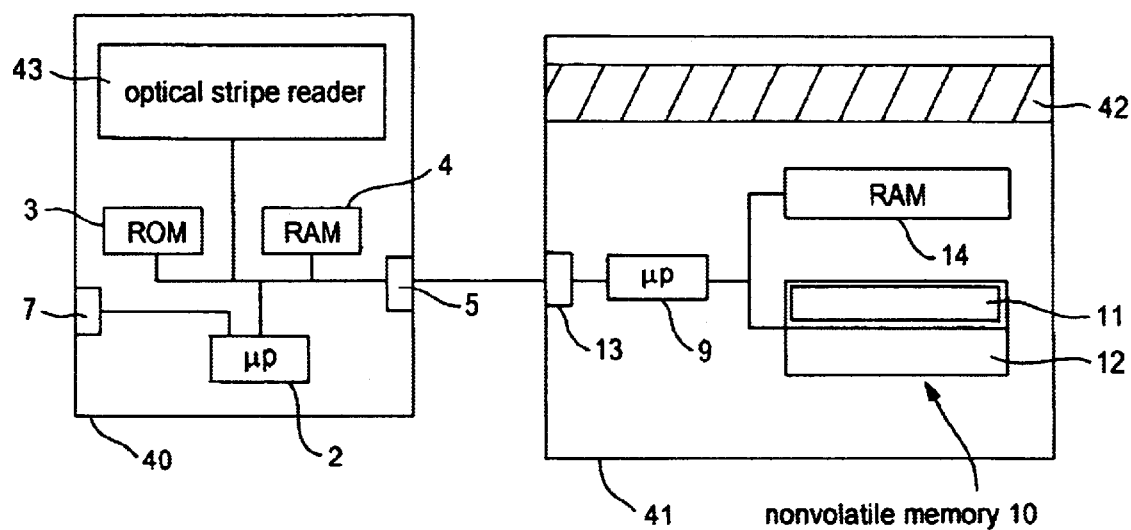
FIG. 4 is a variant of FIG. 2, wherein the information processing device is equipped with a device for reading an optical stripe.

Another variant of embodiment of the invention uses the card reader 40 and the chip card 41 of FIG. 4, wherein the elements in common with FIG. 2 have the same references. The card 41 is distinguished from that 21 of FIG. 2 in that it has an optical stripe 42, for example a stripe to be written and read by laser beam. The card reader 40 is distinguished from that 20 in that it comprises an optical stripe reader 43 capable of reading and writing information on the optical stripe 42, connected to the microprocessor 2 and to the memories 3, 4.

According to the invention, the optical stripe 42 is used as the data bank, in place of the remote ones 23 through 25 of FIG. 1. In practice, during the unloading of an application from the card 41, the card transmits the unload command to the card reader 40. The stripe reader 43 receives the information of the application and writes it onto the optical stripe 42. During a reload command, the card reader activates the stripe reader 43 so that it reads the information of the application on the optical stripe 42; the card reader then transmits this information to the microprocessor 9 of the card so that the latter stores them in the loading area. The load and unload commands are nevertheless unchanged.

In a variant, the optical stripe is replaced by another mass storage medium, for example a magnetic stripe.

In the preceding exemplary embodiments, we have described an unloading of applications from an information processing device to outside this device; in the case of FIG. 2, the card 21 performed an unload to the reader 20 or the data banks 23–25 of FIG. 1; in the case of FIG. 4, the information processing device constituted by the microprocessor 9 and its memories 10, 14 performed an unload to the optical stripe 42. According to another variant of embodiment of the invention, an information processing device performs an unload between several memories of this device. For example, this information processing device is constituted by the card 21 of FIG. 2, and the microprocessor 9 unloads an application from its RAM 14 to its nonvolatile memory 10.

For example, several applications K, J are stored in the nonvolatile memory 10. First, the application K is run. At this time, working information $It_k$ related to the application K is processed in RAM, while a program of the application K remains in nonvolatile memory 10. This working information specifically comprises:

temporary working variables, involved in calculations;

context variables, which allow the card to subsequently resume an interrupted running of an application;

subprograms.

At a given moment, the card must run the other application J and, for this reason, must load working information $It_i$ into the RAM. If the card determines that there is not enough available space in the RAM to receive the working information $It_j$, it decides to stop the running of the application K and to unload the working information $It_k$ of the application K into its nonvolatile memory 10. Then, it runs the application J by loading the associated working information $It_j$ into RAM. After the running of the application J, the card resumes the running of the application K, at the point where it was interrupted, reloading the working information $It_j$ into RAM.

In this last variant of the invention, the load and unload commands are not used, since the information processing device in question has not told an external device to perform the operations for loading and unloading its memories. It still has a table TAB_APPLI, but the latter is simplified compared to the table 2 above; the parameter "signature of the information" is eliminated. In effect, since the information does not leave the information processing device, it does not risk being altered during its unloading.

In the above, we have particularly described the decision by the card to unload a set of information as a result of an order received by the card to load another set of information. It is noted, however, that the invention also covers the case in which the order received by the card is for executing an operation other than the loading of a set of information. For example, a particular process requested with the card may require a memory space larger than the space currently available in the memory of the card; this could be, among other things, a cryptographic calculation. In this case, the card will decide to unload a set of information in order to be able to execute this operation. Another example is the one in which the order received by the card is an order to run an application K that has previously been unloaded from the card. The card must therefore reload this application in order to run it; if there is not enough memory space for this reload, the card will decide to unload another application J, then perform the reloading of the application K.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A chip card 21 including information processing means (9) and main information storage means (10, 14), characterized in that the processing means comprises:

means for detecting, during operation of the chip card, that the main information storage means (10, 14) contain a quantity of information such that the execution of an operation is not possible;

means for selecting, in the main information storage means, a set of information (K) to be unloaded the unloading of which releases space in the main information storage means to allow execution of said operation;

means for unloading the set of information (K) to be unloaded into secondary storage means (23 through 25; 42; 53), in the event that said secondary storage means do not contain said set of information to be unloaded.

2. The chip card according to claim 1, further comprising a loading table (TAB_APPLI) stored in the main information storage means and including a storage indicator constructed and arranged to indicate for at least one set of information, whether or not the at least one set of information is stored in the main information storage means, so that when the processing means (9) must have access to said set of information, the processing means (9) consults said storage indicator; and the processing means including means for accessing the set of information stored in a first case, and means for sending to the secondary storage means (23 through 25; 42; 53), a command for loading the set of information in a second case in which the storage indicator indicates that the set of information is not stored.

3. The chip card according to claim 2, wherein the storage indicator comprises a "loaded" state indicating that a corresponding set of information has been loaded into the chip card from the secondary storage means (23 through 25; 42; 53) and an "unloaded" state indicating that the set of information has been unloaded by the chip card into the secondary storage means.

4. The chip card according to claim 1, further comprising a loading table (TAB_APPLI) stored in the main information storage means (10, 14) and including a modification indicator configured and arranged to indicate, for at least one set of information, that a first version of the set of information has been loaded into the chip card from the secondary storage means (23 through 25; 42; 53), whether or not the first version has been modified in the chip card, wherein when said set of information must be unloaded into the secondary storage means, the set of information is not actually unloaded unless said first version has been modified.

5. The chip card according to claim 1, configured and arranged to store at least one set of information in two parts, said at least one set including a subset of application information (p-cod) containing a program and general data for running an application, and a subset of sequence information (p-dat) containing specific data defining a particular session of the running of the application, comprising means for detecting that several sets of information have the same subset of application information (p-cod) and respective different subsets of sequence information (p-dat), so that the processing means causes said subset of application information to be stored in the main information storage means (10, 14) only once, and so that said processing means associates with the subset of application information each of said subsets of sequence information.

6. The chip card according to claim 5, which comprises:

means for detecting, during operation of the chip card, that the main information storage means (10, 14) contain a quantity of information such that additional storage of a first subset of sequence information (p-dat) to be stored, associated with a subset of application information (p-cod) already stored, is not possible;

means for selecting, in the main information storage means, a second subset of sequence information to be unloaded, associated with the same subset of application information, the unloading of which can release enough space in the main information storage means to allow the storage of said first subset of sequence information to be stored;

means for unloading said second subset into said secondary storage means (23 through 25; 42; 53) in the event that said secondary storage means do not contain said second subset of sequence information to be unloaded; and means for storing in the main information storage means the first subset of sequence information to be stored.

7. The chip card according to claim 5, further comprising a loading table (TAB_APPLI) stored in the main information storage means and including, for each subset of application information stored, a maximum number (s) of associated sequences that can be stored in the main information storage means.

8. The chip card according to claim 1, further comprising means for reloading into the main information storage means (10, 14) a set of information previously unloaded into the secondary storage means (23 through 25; 42; 53).

9. The chip card according to claim 8, further comprising a loading table (TAB_APPLI) stored in the main information storage means (10, 14) and including, for at least one set of information (K) processed by the device, a first signature (SGN-K) of said at least one set of information calculated by the processing means (9) before the possible unloading of said at least one set of information, with a signature key (SWAP) stored in the main information storage means, the processing means being configured and arranged to calculate a second signature of a set of information to be reloaded, in order to compare the second signature with the first signature, so as to validate reloading of the set of information to be reloaded in the event that the two signatures are identical, and to invalidate the reloading of the set of information to be reloaded in the event that the two signatures are different.

10. A method for managing the memory in a chip card having information processing means (9) and main information storage means (10, 14), comprising the steps consisting of:

detecting, during operation of the chip card, that the main information storage means (10, 14) contain a quantity of information such that execution of an operation is not possible;

selecting, in the main information storage means, a set of information (K) to be unloaded, the unloading of said set being sufficient to release enough space in the main information storage means to allow execution of said operation;

unloading the set of information (K) to be unloaded into secondary storage means (23 through 25; 42; 53), in the event that said secondary storage means do not contain said set of information to be unloaded.

11. The method according to claim 10, further comprising the steps of:

detecting, during operation of the chip card, that the main information storage means (10, 14) contain a quantity of information such that an additional storage of a previously unloaded set of information is possible; and reloading into the main information storage means said set of unloaded information.

12. The method according to claim 10, further comprising the steps of:

detecting, during operation of the chip card, that the main information storage means (10, 14) contain a quantity of information such that an additional storage of a previously unloaded set of information (K) is not possible;

selecting, in the main information storage means, a set of information (J) to be unloaded, wherein the unloading of said set of information results in the release of enough space in the main information storage means to allow the storage of said previously unloaded set of information;

unloading the set of information (J) to be unloaded into the secondary storage means (23 through 25; 42; 53), in the event that said secondary storage means do not contain said set of information to be unloaded; and reloading into the main information storage means said previously unloaded set of information (K).

13. The method according to claim 10, wherein said secondary storage means comprise a data bank (23–25) remote from the chip card and linked to the chip card by a data transmission network (26).

14. The method according to claim 10, wherein said secondary storage means is part of an information processing device (20) cooperating with said chip card (21).

15. The method according to claim 10, wherein said secondary storage means (42; 53) is part of the chip card.

16. A method for communication between a chip card and a chip card reader, the chip card comprising information processing means (9) and main information storage means (10, 14), comprising the steps of:

transmitting from the card reader to the chip card an order to execute an operation;

searching by the chip card to determine whether the chip card has enough space in the main information storage means to execute the operation;

if enough space has been determined, sequentially executing by the card reader said operation, and transmitting an execution report to the card reader; or in the main information storage means a set of information (K) to be unloaded, the unloading of said set of information (K) being sufficient to release space in the main information storage means to allow the execution of said operation, then transmitting an unloading order to the reader to unload the set of information (K) to be unloaded into secondary storage means, wherein, in the event that said secondary storage means (23 through 25; 42; 53) do not contain said set of information to be unloaded, then executing said operation and transmitting an execution report to the reader.

17. The method according to claim 16, wherein said operation includes a step of loading a set of information (J) to be stored, comprising the steps of:

transmitting an order to the card by the reader to load said set of information (J) to be stored;

searching by the card to determine whether the main information storage means has enough space for execution of the loading order;

if enough space has been determined, the card executes the loading order, then transfers an execution report to the reader;

if enough space has not been determined, the card:
transmits an order to the reader to suspend the loading;
selects a set of information (K) to be unloaded in the main information storage means, the unloading of said set of information being sufficient to release enough space in the main information storage means to allow execution of the unloading order;

unloads the set of information (K) to be unloaded into the secondary storage means by transmitting an unloading order to the card reader when said secondary storage means (23 through 25; 42; 53) do not contain said set of information to be unloaded;

transmits to the reader an order to resume the loading order;

executes said loading order, then transmits an execution report to the reader.

18. The method according to claim 16, wherein said order to execute an operation comprises the step of activating an electric power supply of the card by the card reader.

\* \* \* \* \*